Figure 1:
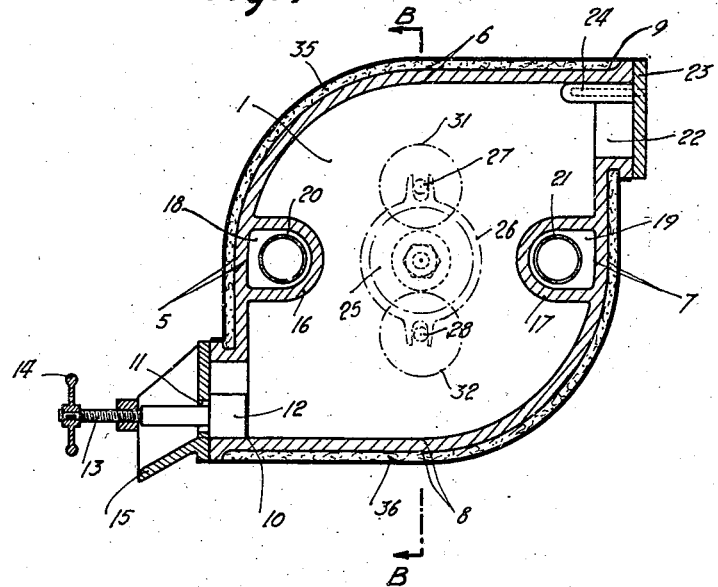

Aug. 22, 1944.   R. PERRIN   2,356,529
PURIFYING METAL
Filed June 7, 1940

Inventor
René Perrin.
By Stebbins & Blenko,
Attys.

Patented Aug. 22, 1944

2,356,529

UNITED STATES PATENT OFFICE 2,356,529

PURIFYING METALS

René Perrin, Paris, France; vested in the Alien Property Custodian

Application June 7, 1940, Serial No. 339,389
In France June 19, 1939

8 Claims. (Cl. 75—85)

It is known that by means of rocking or rotary apparatus comprising chambers capable of receiving a metal and a liquid or solid reagent so arranged that by causing the apparatus to rock or rotate each chamber pours its contents into the other chamber, it is possible to obtain an intimate mixture of the metal and the reagent, this mixture giving rise to a very considerable increase of the surfaces of contact between the reactant and the metal and to rapid renewal of these surfaces.

Means of this kind have been applied with success to the metallurgy of steel, of ferro-alloys, of copper, etc. They lead in all cases to results which are perfectly regular from one operation to another this being due to the fact that equilibrium between the slag and the metal is reached in each one of these operations. These equilibria like all equilibria of chemical reactions are a function to a certain degree of the temperature. Experiment shows that for the above reactions the influence of this factor may be practically controlled adequately because the size of the variations capable of giving irregularity in the final result is perfectly compatible with the habitual practical means of regulation of the temperature of metallic baths or baths of molten slag.

It is not the same for all reactions between metals and reagents capable of extracting impurities contained in these metals, and the present invention is concerned with reactions which have to be effected at relatively low temperatures because their chemical equilibria are very strongly influenced by the temperature at which the operation is effected, a satisfactory yield only being obtainable at relatively low temperatures.

In such reactions as for example the known reaction of the chloride of tin upon lead present as an impurity in tin or a tin alloy, the temperature of the operation has such a considerable effect on the displacement of the equilibrium that variations of temperature which are even very small lead to extremely considerable differences of the yield of the slag or of the purifying material employed.

If it is sought to apply to such reactions the well known principle of intermixing between a slag and a metal, it is observed that as in the high temperature metallurgical reactions there is reached in all cases the chemical equilibrium between the slag and the metal, but as the least variation of temperature, for example ten or twenty degrees C. modifies in a very important way the equilibrium constant of the reaction, the final result of the operation is not constant and may even be clearly bad if the temperature at the end of the operation varies considerably from that which would give the best results.

It is important in fact to observe that despite the practical precautions which may be taken to produce rigorously constant temperatures for the operations in view, sufficiently good results are not obtained. Thus it is vain to attempt—before putting them in contact—to bring the slag and the metal to the temperature best suited for the reaction and then to intermix this metal and slag according to known processes for the following reasons:

(1) It is impossible in the metallurgical apparatus in which the slag or metal are melted to impart to the metal and to the slag a temperature rigorously uniform and constant throughout their mass.

(2) During the intermixing temperature variations are produced which also lead to prohibitive variations of the value of the equilibrium constant.

Thus the operation is finished at very irregular temperatures and the risk is run of finishing too hot and having an insufficient yield, or of finishing too cold and solidifying the metal or the slag in the apparatus.

The invention is based upon the discovery that by applying under certain conditions the mixing process mentioned above to purifying reactions between metals and reacting elements, which are favoured to a large extent by lowering the temperature, it is possible to ensure under conditions of remarkable automaticity with a very great speed and a particularly high degree of regularity, a very far-reaching purification of these metals despite the considerable importance which even extremely small variations of temperature exercise on the equilibrium of the reaction.

This process consists essentially in mixing the two phases, metal and purifying element, by starting from a temperature higher than the temperature chosen for the reaction with an energy sufficient so that the temperature of the mass is equal at all points and that the chemical equilibrium between the two phases may be obtained as rapidly as possible, while retarding sufficiently the cooling of the mass by a regular application of heat, so that this mass remains sufficiently long at a temperature little above the melting point of the metal, so that the chemical equilibrium is reached during this time between the metal and the slag formed by the reaction of the reacting element upon the impurity or impurities of the metal.

It is to be noted that the initial temperature of the whole of the reacting elements may vary from one operation to another and need not be adjusted with precision.

For effecting the process the rapidity of equalizing the temperature is ensured by forming the internal part of the intermixing apparatus of a material which is a good heat conductor capable consequently of readily absorbing at the hottest part the excess heat and of transferring it very rapidly to the part of the mass which is at a lower temperature. This means favours the evening of the temperature of the slag, of the metal and of the internal part of the intermixing apparatus.

With the object of slowing down the variations of this uniform temperature of the slag, of the metal and of the interior wall of the apparatus, the apparatus is heat insulated outside and moreover if need be there is arranged an auxiliary heating means allowing to be introduced into it and consequently into the metal-slag mass, heat brought from an external source. In this manner the heat losses may be regulated so that the operation of treatment of the metal by the slag is maintained for sufficient time at the most suitable temperature for the best yield, which temperature is chosen according to the reaction.

Inside the apparatus is or are arranged one or more pyrometers capable of giving at each moment a measurement of the uniform temperature of the metal, slag and interior wall of the furnace which is produced by the above means.

The variation curve for the temperature given by the pyrometer, is watched and the operation stopped when the intermixing has been effected for a sufficiently long time in the immediate neighbourhood of the optimum temperature chosen for the reaction so that the equilibrium corresponding to this temperature has been practically obtained. This time will be the shorter the more energetic the intermixing.

The whole of these measures thus allows even starting from initial temperatures of slag and metal which are not precisely determined and with the sole condition of starting from an initial temperature in the apparatus above that chosen for the reaction, of allowing the temperature in the interior of the apparatus to be reduced progressively while producing the equilibrium between slag and metal and finally of precisely stopping the operation when for a sufficient time a temperature has been reached very near the temperature chosen for the reaction.

It is very remarkable to observe that when applying the process defined above, it is possible to operate with success within the zone of the solidification temperature, that is to say below the commencement of solidification when one is concerned with an impure metal or an alloy, and this in spite of the viscosity assumed at this moment by the liquid phase of the metal by reason of the precipitation of a solid phase which is formed by crystals which precipitate in the body of the liquid mass. Very often in fact the impurities which it is proposed to eliminate from the metal are insoluble in the solid phase which precipitates, and remain dissolved in the liquid phase where their concentration increases as the temperature becomes lower.

By the process of the invention the reaction proceeds much further than in the processes already known for purification, since it is favoured on the one hand by the lowering of the temperature and on the other hand by the effect of the increasing concentration of the impurity in the part of the metal which remains liquid.

The apparatus suitable for the application of the present invention may be any mixing apparatus of known type operating by alternate or successive pourings from one chamber into another, with the condition that the metal and the reacting substance or the slag which is formed are poured togethehr each time with an energy sufficient to bring about intimate mixture of the metal and of the reactant or of the slag. This apparatus will be provided with heating devices allowing a predetermined and regular temperature to be maintained in the apparatus. The variations of this temperature will be controlled by means of measuring devices arranged in the apparatus.

Figure 2:
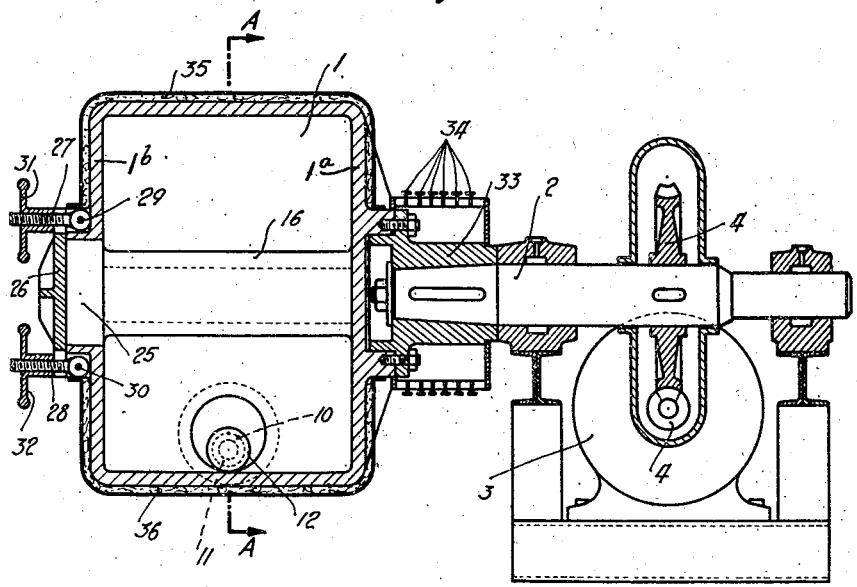

One form of apparatus which is particularly suitable for performing the process of the invention is illustrated in the accompanying drawing in which Figure 1 is a transverse section along A—A of Figure 2 and Figure 2 is a longitudinal section along B—B of Figure 1.

In the form of construction shown in the drawing the apparatus is formed of a metal chamber 1 mounted on a rotary axis 2 driven by a motor 3 through a reducing gear 4 formed of an endless worm and worm wheel. The chamber 1 is formed of two quarter cylinders between the points marked 5 and 6 and 7 and 8 respectively, and two dihedral angle sections identified by the reference numerals 6, 9, 7, and 8, 10, 5 respectively, which are tangents to the quarter cylinders, and it comprises a back wall 1a and a front wall 1b. A pouring orifice 11 is closed by a sluice 12 controlled by a screwed rod 13 and a hand wheel 14. Below the orifice 11 is a pouring lip 15.

Inside the chamber 1 project the walls 16 and 17 of two cavities 18 and 19 in which are placed heating electrical resistances 20 and 21. An orifice 22 is closed by a plate 23 provided with a cavity 24 intended to receive a pyrometer. The front wall 1b is apertured to provide a charging orifice 25 normally closed by a door 26 by means of screwed rods 27, 28 and handwheels 31, 32. Upon the hub 33 which carries the chamber 1 and which is keyed on the axis 2 are mounted the rings 34 for the supply of electric current to the heating resistances 20 and 21 and to transmit the current from the pyrometer 24.

The metal to be purified and a reactant are introduced through the doors 25, 26 which is then closed. The heat necessary for the regulation of the temperature is produced by the resistances 20 and 21 and is transmitted to the walls 16 and 17 of the cavities 18, 19. When the apparatus is caused to rotate the walls 16 and 17 of the cavities have the double effect of raising the metal or the reactant or the slag and of communicating to the mass undergoing treatment the heat evolved by the resistances 20 and 21. During the rotation of the apparatus the mass coming into contact with the pyrometer 24 causes the latter to give at each half rotation of the apparatus the temperature of the mass. The heat insulation 35—36 which surrounds the apparatus retards the heat loss.

The process and the apparatus according to the invention lend themselves for example particularly well to the elimination of the lead contained in tin and in antifriction alloys. This purification is based upon the known reversible reaction of the chloride of tin upon lead, $SnCl_2 + Pb = PbCl_2 + Sn$. This reaction is in fact very strongly influenced by the temperature of the operation, the equilibrium of the reaction being displaced towards the right more strongly the lower the temperature. In other words the elimination of the lead is effected more readily the lower the temperature, or again for a given consumption of the tin chloride the lower the temperature the less the final content of lead of the treated metal.

In common practice, even when the reaction is effected in the furnace at temperatures little above the solidification point of the alloy, it gives very irregular results with unsatisfactory yield, the consumption of tin chloride is prohibitive and renders the operation uneconomical. The application of the process according to the invention to the removal of lead from tin or anti-friction metals by reason of the fact that it permits the two liquid phases (metal and tin chloride introduced liquid into the apparatus or melted therein) to be brought to a determined temperature very near the solidification point of the metal, and due to the intimate mixture which it allows of these two phases when they are at this temperature, leaves on the contrary the certainty of the establishment of the chemical equilibrium corresponding to this temperature.

Preferably the apparatus is heated before introducing the metal and the reactant. This heating may arise for example from the heat remaining in the apparatus after a preceding operation to which may be added if the case arises the heat arising from the electric heaters 20 and 21 the temperature of which may be maintained constant by means of a regulator. It is necessary that the total heat contained in the apparatus from the beginning of the operation, that is to say the heat arising from the apparatus proper and that contained in the metal and possibly in the tin chloride should be sufficient to allow the contents of the apparatus to reach a temperature above the temperature of complete solidification of the metal. This temperature to which the contents of the apparatus is brought should be as near as possible to the temperature chosen for the reaction, it may for example differ therefrom by 10° C. only.

In the case of the anti-friction metal (or tin) and tin chloride, the tin chloride is preferably first charged into the previously heated apparatus and the chamber 1 is turned by means of the motor 3 in order to begin the intermixing. This way of proceeding permits the rapid production firstly of dehydration and then of fusion of the tin chloride. The liquid metal is not charged until the dehydration is completely finished.

Then rotation of the apparatus is continued, the elements charged begin to mix and then the indication of the pyrometer introduced into the cavity 24 is observed. It will be realised that one may for example pre-heat the apparatus to a temperature above the optimum temperature for the reaction, introduce the metal and the slag likewise pre-heated to a temperature slightly above this optimum temperature and then leave the temperature to be reduced naturally in the apparatus while continuing the intermixing.

In a general manner unless the heat insulation of the apparatus is very efficacious it will be necessary to introduce heat into the apparatus by means of the elements 19 and 20 so as to maintain the mass undergoing treatment for a sufficient time at the temperature slightly above the solidification point of the metal until the equilibrium between the slag and metal is reached. The temperature should vary very slowly in the neighborhood of the optimum value and the reacting elements should remain in the immediate neighbourhood of this temperature while continuing to be subjected to successive pourings until the chemical equilibrium is reached. This result will be obtained very readily due to the regulation of the temperatures of the heating elements which regulation will permit the losses of heat in the apparatus to be very conveniently compensated.

Once the optimum temperature for the tin or the anti-friction metal and the tin chloride is known and when the time is known for which it is necessary to maintain the mass at the temperature chosen for the reaction so that the chemical equilibrium is obtained, it will be sufficient after having charged the apparatus with pre-heating of the latter and the temperature of the metal and of the tin chloride being selected so that they are sufficient for the mass to be melted at a temperature above the optimum temperature for the reaction, to observe the pyrometer placed in the apparatus and then when the temperature has arrived in the neighbourhood of the optimum temperature for the reaction, to continue the rotation of the apparatus for a time determined by previous experiments, for example 2 minutes, after which it is only necessary to run off the metal, the results obtained being perfectly regular. The operation thus becomes absolutely automatic.

Obviously the operation may be renewed several times successively using each time a new slag.

Likewise the principle of counter current may be employed. For example a metal charge already partially purified will be treated with fresh tin chloride, this charge will be poured and a new charge of impure metal will be introduced which will be treated firstly by the slag from the preceding operation to purify it partially and so on.

The invention is illustrated by the following examples:

*Example 1*

The starting material is a tin containing 1.62% of lead. 26 kgs. of solid tin chloride is charged in the apparatus previously heated to about 275° C. The apparatus is rotated to dehydrate the chloride and cause it to melt. Then into the apparatus is charged 200 kgs. of the tin to be treated in the molten state and rotation of the apparatus is continued. The pyrometer indicates 275° C. Then the apparatus is rotated for about 10 minutes until the temperature is reduced to 270° C. and from this moment the apparatus is turned for 2 minutes longer, then the operation is stopped and the metal run off. The temperature of 270° C. is fixed for effecting the reaction because below this temperature the tin chloride enriched in lead chloride becomes too viscous. The operation has lasted in all 20 minutes. The metal obtained does not contain more than 0.35% of lead. The same metal already partially purified is taken and acted upon with 13% of tin chloride by rotation of the apparatus, selecting 250° C. as the temperature for the reaction. After treatment the metal thus treated does not contain more than 0.08% of lead. The second operation likewise lasts about 20 minutes.

*Example 2*

The starting material is an anti-friction metal containing about 83% of tin, 11% of antimony, and 6% of copper. This alloy contains 1.5% of lead. 22 kgs. of tin chloride are melted in the apparatus and then 200 kgs. of metal in the molten state are introduced. The temperature indicated by the pyrometer is then 270° C. The temperature is allowed to fall to 260° C. while the apparatus is rotating and starting from this moment the apparatus is rotated for a further 2 minutes in the immediate neighbourhood of this temperature. The anti-friction metal thus treated does not contain more than 0.5% of lead. This operation lasts in all 15 minutes.

It is to be noted that in operations for the removal of lead effected in a furnace previously to this process 35–40 hours were necessary to obtain a purification from lead like that of the above example. In fact it was necessary to maintain a temperature above the temperature of complete melting of the alloy which is of the order of 400° C. The temperature in the vat of the furnace was non-uniform (having variations of the order of 80° C. inside the same vat at the same moment). The result was variable from one operation to the other and the proportion of slag to be employed instead of being 11% was about 33% of the weight of the charge.

What I claim is:

1. A process of removing lead from tin or tin alloy containing lead as an impurity, which comprises providing a fused mixture of said impure metal and tin chloride at a temperature above the optimum reaction temperature of the tin chloride with the lead of the impure metal, mixing the mass with an energy sufficient so that the temperature of the mass is equal at all points and that chemical equilibrium is obtained as rapidly as possible, mixing said mass and retarding the cooling of the mass as it approaches said optimum reaction temperature so that the mass remains sufficiently long at a temperature only slightly above the melting point of the mass that chemical equilibrium between the metal and the slag formed by the reaction is reached during the period of retarded cooling.

2. A process of removing lead from tin or tin alloy containing lead as an impurity, which comprises providing a fused mixture of said impure metal and tin chloride at a temperature of only about 10° C. above the optimum reaction temperature of the tin chloride with the lead of the impure metal, mixing the mass with an energy sufficient so that the temperature of the mass is equal at all points and that chemical equilibrium is obtained as rapidly as possible, mixing said mass and retarding cooling of the mass during the period that it is cooling from said first named temperature to the optimum reaction temperature, said mixing and retarded cooling actions being such that the mass remains sufficiently long at a temperature only slightly above the melting point of the mass that chemical equilibrium between the metal and the slag formed by the reaction is reached during the period of retarded cooling.

3. A process of removing lead from tin or tin alloy containing lead as an impurity, which comprises providing a fused mixture of said impure metal and tin chloride at a temperature above the optimum reaction temperature of the tin chloride with the lead of the impure metal, mixing the mass while in contact with good heat conducting material and with an energy sufficient so that the temperature of the mass is equal at all points and that chemical equilibrium is obtained as rapidly as possible, mixing said mass and retarding the cooling of the mass as it approaches said optimum reaction temperature so that the mass remains sufficiently long at a temperature only slightly above the melting point of the mass that chemical equilibrium between the metal and the slag formed by the reaction is reached during the period of retarded cooling.

4. A process of removing lead from tin or tin alloy containing lead as an impurity, which comprises providing a fused mixture of said impure metal and tin chloride at a temperature of only about 10° C. above the optimum reaction temperature of the tin chloride with the lead of the impure metal, mixing the mass while in contact with good heat conducting material and with an energy sufficient so that the temperature of the mass is equal at all points and that chemical equilibrium is obtained as rapidly as possible, mixing said mass and retarding cooling of the mass during the period that it is cooling from said first named temperature to the optimum reaction temperature, said mixing and retarded cooling actions being such that the mass remains sufficiently long at a temperature only slightly above the melting point of the mass that chemical equilibrium between the metal and the slag formed by the reaction is reached during the period of retarded cooling.

5. A process of removing lead from tin or tin alloy containing lead as an impurity, which comprises providing a fused mixture of said impure metal and tin chloride at a temperature above the optimum reaction temperature of the tin chloride with the lead of the impure metal, mixing the mass with an energy sufficient so that the temperature of the mass is equal at all points and that chemical equilibrium is obtained as rapidly as possible, mixing said mass and retarding the cooling of the mass as it approaches said optimum reaction temperature so that the mass remains sufficiently long at a temperature only slightly above the melting point of the mass that chemical equilibrium between the metal and the slag formed by the reaction is reached during the period of retarded cooling, the mixing of said mass and the retardation of cooling of said mass as it approaches said optimum reaction temperature being accomplished by contacting said mass with a heating element.

6. A process of removing an impurity from a metal or alloy containing impurity, which comprises providing a fused mixture of said impure metal and a reactant which reacts with the impurity in a manner favored by lowering the temperature, said mixture being at a temperature above the optimum reaction temperature of the impurity with the reactant, mixing the mass with an energy sufficient so that the temperature of the mass is equal at all points and that chemical equilibrium is obtained as rapidly as possible, mixing said mass and retarding the cooling of the mass as it approaches said optimum reaction temperature so that the mass remains sufficiently long at a temperature only slightly above the melting point of the mass that chemical equilibrium between the metal and the slag formed by the reaction is reached during the period of retarded cooling.

7. A process of removing an impurity from a metal or alloy containing impurity, which comprises providing a fused mixture of said impure metal and a reactant which reacts with the impurity in a manner favored by lowering the temperature, said mixture being at a temperature above the optimum reaction temperature of the impurity with the reactant, mixing the mass while in contact with good heat conducting material and with an energy sufficient so that the temperature of the mass is equal at all points and that chemical equilibrium is obtained as rapidly as possible, mixing said mass and retarding the cooling of the mass as it approaches said optimum temperature so that the mass remains sufficiently long at a temperature only slightly above the melting point of the mass that chemical equilibrium between the metal and the slag formed by the reaction is reached during the period of retarded cooling.

3. A process of purifying a metal by means of a reacting substance, the purifying rate of which is higher as the temperature is lower, which consists in bringing the bath of metal and reacting substance to a temperature above the one at which the purifying rate is optimum, causing the said bath to cool down with such slowness, while energetically intermixing the metal and the reacting substance, that, by the maintenance of the temperature of the bath, by adding external heat, at a degree substantially corresponding to the chosen rate of purification while keeping up the energetic intermixing of the metal and reacting substance, chemical equilibrium is reached between the bath of metal and the reacting substance at the said degree of temperature, and then causing the formed slag to separate from the purified metal.

RENÉ PERRIN.